United States Patent [19]
Redding, Jr.

[11] 3,829,120
[45] Aug. 13, 1974

[54] VEHICLE SUSPENSION SYSTEM
[75] Inventor: Harry L. Redding, Jr., Rochester, Mich.
[73] Assignee: General Motors Corporation, Detroit, Mich.
[22] Filed: June 28, 1973
[21] Appl. No.: 374,467

[52] U.S. Cl. ............................. 280/124 B, 267/58
[51] Int. Cl. ............................................ B60g 11/20
[58] Field of Search............ 267/58, 155; 280/124 R, 280/124 A, 124 B

[56] References Cited
UNITED STATES PATENTS
2,865,045   12/1958   Miller ............................. 267/155 X
3,733,067   5/1973    Allison ....................... 280/124 B X
3,770,291   11/1973   Kramer ........................... 280/124 B FOREIGN PATENTS OR APPLICATIONS
521,753   5/1940    Great Britain ....................... 267/58
545,346   8/1957    Canada ................................ 267/58
636,972   10/1936   Germany ............................. 267/58

Primary Examiner—Trygve M. Blix
Assistant Examiner—Stephen G. Kunin
Attorney, Agent, or Firm—Saul Schwartz

[57] ABSTRACT

An auxiliary spring arrangement for a four-bar link type automobile suspension system wherein an axle carrier is connected to the vehicle sprung mass through a plurality of control arms which constrain jounce and rebound deflection of the axle carrier to an orbit about a transverse axis of the sprung mass, the auxiliary arrangement including a torsion spring supported on the axle carrier and having an integral lever arm engaging the sprung mass generally at the transverse axis. The torsion spring develops a turning moment on the lever arm which, in turn, alters the curb height of the sprung mass under static conditions and the proximity of the lever arm to the transverse axis minimizes the tendency of the lever arm to further twist the torsion spring during jounce deflection so that the effect of the auxiliary spring on the ride rate experienced by the sprung mass is negligible.

4 Claims, 6 Drawing Figures

PATENTED AUG 13 1974

VEHICLE SUSPENSION SYSTEM

This invention relates generally to vehicle suspension systems and, more particularly, to an auxiliary spring arrangement within the suspension system for trimming the curb height of the vehicle sprung mass portion.

Each component part of an automobile is manufactured within certain tolerance limits. This is true, also for the outside dimensions of the assembled vehicle. For example, the static or curb height of the sprung mass portion of the vehicle should lie between predetermined limits. However, after final assembly, the sprung mass portion of the vehicle might be somewhat heavier or lighter than anticipated in which cases the suspension spring will not maintain the sprung mass portion within the curb height limits. These conditions are commonly corrected by disposing helper or auxiliary springs between the sprung and unsprung mass portions of the vehicle. Heretofore, however, these auxiliary springs have been known to alter the ride rate experienced by the sprung mass portion of the vehicle. In an improved suspension system according to this invention, auxiliary springs are arranged to adjust the sprung mass curb height with only negligible effect on the ride rate.

The primary feature, then, of this invention is that it provides an improved vehicle suspension system. Another feature of this invention is that it provides an improved vehicle suspension system including a novel auxiliary spring arrangement for adjusting or trimming the curb height of the sprung mass portion of the vehicle. Yet another feature of this invention is that it provides an auxiliary spring arrangement for trimming the curb height of the sprung mass portion without significantly altering the suspension ride rate. A further feature of this invention is that it provides an auxiliary spring arrangement including a torsion spring having a lever arm, the spring being disposed on the unsprung mass portion and engaging the sprung mass portion generally at the center of rotation of the unsprung mass portion relative to the sprung mass portion so that during jounce deflection the auxiliary spring exerts little or no increased force on the sprung mass portion. A still further feature of this invention resides in the provision of an adjustment arrangement which allows the force exerted by the torsion spring to be altered without removing the spring or its supporting structure from the vehicle. These and other features of this invention will be readily apparent from the following specification and from the drawings wherein:

Figure 1:
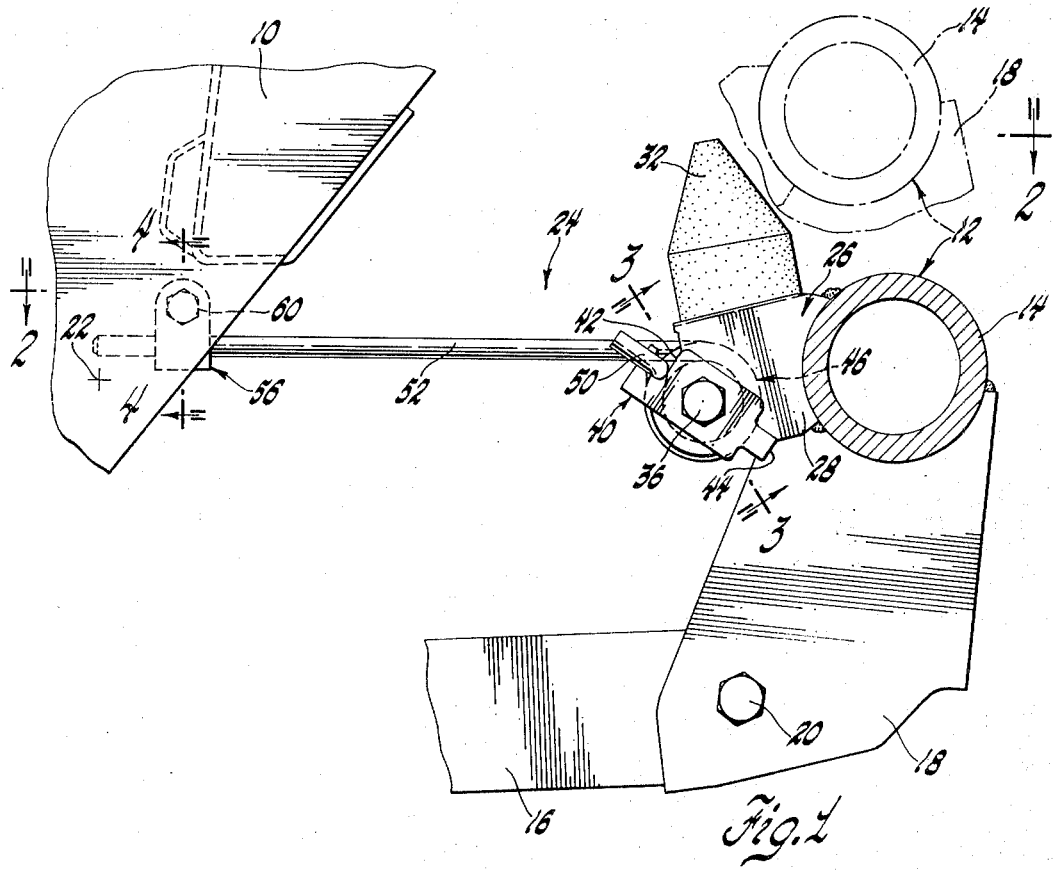
FIG. 1 is a fragmentary, side elevational view of an automobile type rear suspension system including an auxiliary spring arrangement according to this invention.
Figure 2:
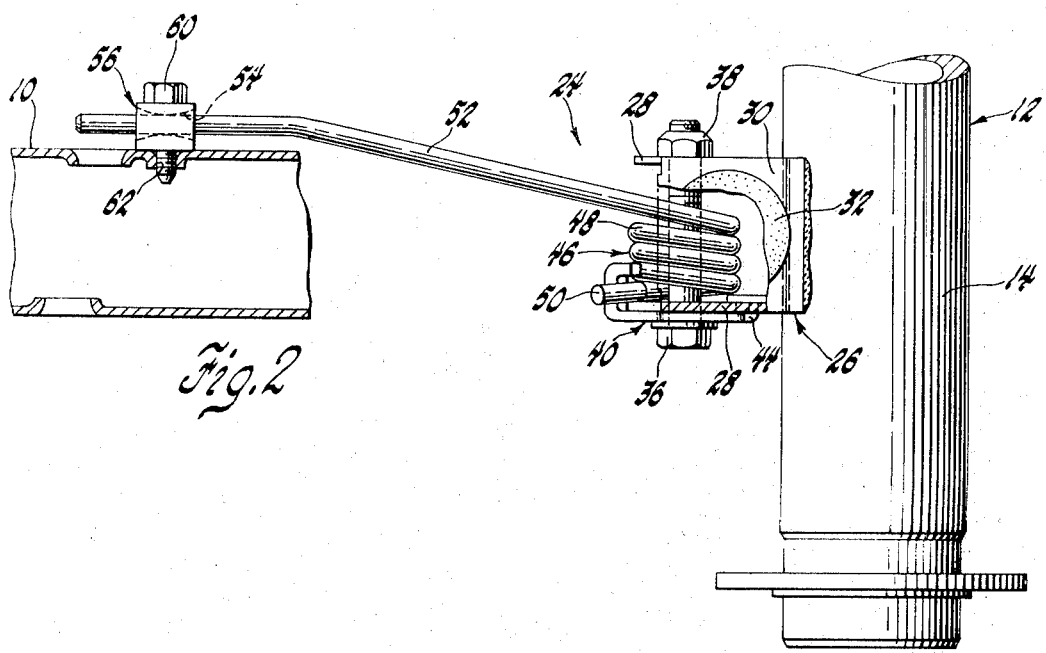
FIG. 2 is a sectional view taken generally along the plane indicated by lines 2—2 in FIG. 1.

Referring now to FIGS. 1 and 2 of the drawings, thereshown is a portion of a typical automobile type rear suspension system adapted to connect the sprung mass portion of the vehicle and the unsprung mass portion. The sprung mass portion normally includes the vehicle body, not shown, and the chassis frame to which the latter is connected, the frame typically including a pair of laterally spaced, longitudinally extending rails of which only a left side rail 10 is shown in FIGS. 1 and 2. Adjacent the rear suspension system, each side rail includes an arch or kick-up providing clearance for an axle carrier assembly, designated generally 12, disposed transversely with respect to the vehicle body. The axle carrier assembly defines a part of the unsprung mass portion of the vehicle and includes a centrally located differential carrier, not shown, and a pair of axle tubes extending laterally in opposite directions from the carrier, only a left axle tube 14 being shown in FIGS. 1, 2, 3, 5 and 6. A pair of axle shafts, not shown, are rotatably disposed within corresponding ones of the axle tubes and support at their outboard ends the rear road wheels of the vehicle.

The axle carrier assembly 12 is connected to the sprung mass portion of the vehicle through a conventional four-bar link arrangement which includes a pair of laterally spaced upper control arms, not shown, attached to the sprung mass portion and to the axle carrier assembly above the centerline of the axle shafts. The four-bar link arrangement further includes a pair of laterally spaced lower control arms attached to the sprung mass portion and to the axle carrier assembly below the centerline of the axle shafts, only a portion of one lower control arm 16 being shown in FIG. 1. As seen best in FIG. 1, a depending bracket 18 welded to the tube 14 is pivotally connected to one end of the control arm 16 through a bolt 20. The four-bar link arrangement functions to constrain movement of the axle carrier assembly 12 to a predetermined orbit about a transverse axis 22 of the sprung mass portion of the vehicle. A pair of transversely spaced coil springs, not shown, are disposed between the axle carrier assembly and the sprung mass portion for providing primary vehicle suspension. The coil springs are designed to maintain the sprung mass portion at a predetermined curb height under static conditions. An auxiliary spring arrangement according to this invention and designated generally 24 is provided in the suspension system to trim or adjust the curb height to a desired level in the event that the sprung mass portion is slightly heavier or lighter than expected. It will be understood, of course, that two auxiliary spring arrangements 24 are disposed symmetrically on opposite sides of the longitudinal plane of symmetry of the vehicle and that only the left side arrangement is described hereinafter to avoid confusion and repetition.

Referring now to FIGS. 1 through 4, the auxiliary spring arrangement 24 includes a bracket 26 rigidly attached to the tube 14, as by welding. The bracket 26 includes a pair of depending transversely spaced legs 28 interconnected by a web 30. A bumper 32 is supported on the web 30 for engagement on the frame rail 10 during extreme jounce conditions.

Figure 3:
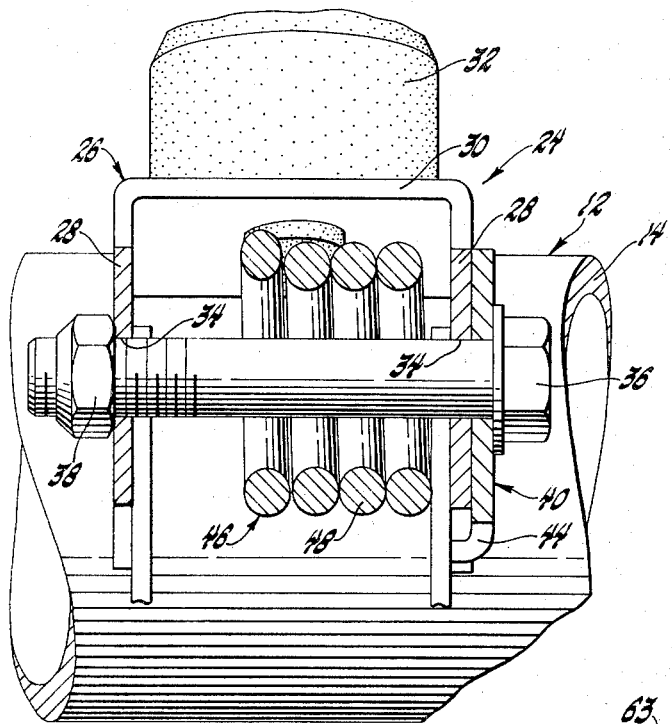
FIG. 3 is an enlarged sectional view taken generally along the plane indicated by lines 3—3 in FIG. 1.
Figure 4:
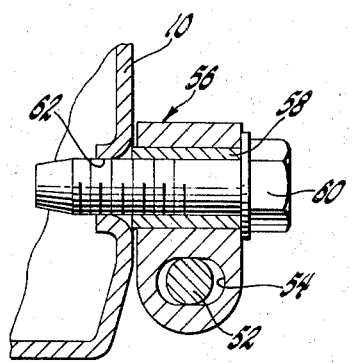
FIG. 4 is an enlarged sectional view taken generally along the plane indicated by lines 4—4 in FIG. 1.

As seen best in FIG. 3, the depending legs 28 of the bracket 26 include a pair of aligned apertures 34 which receive therethrough a bolt 36, the bolt being retained on the bracket by a nut 38. A locking bar 40 is rotatably disposed on the bolt 36 between the head of the latter and the adjacent leg 28 of the bracket, the bar including a slot 42 and a tab 44, FIG. 1.

Disposed between the depending legs 28 and around the bolt 36 is a torsion type auxiliary spring designated generally 46 including a cylindrical coil portion 48 defining a tab 50 at one end thereof and a lever arm portion 52 integral with the coil portion and extending from the other end thereof. The cylindrical coil portion 48, of course, defines a longitudinal axis which generally coincides with the longitudinal axis of the bolt 36. The lever arm portion 52 is pivotable generally about the longitudinal axis of the coil portion. The coil portion 48 is adapted, in a well known manner, to generate a turning moment on the lever arm portion 52 urging the latter in one direction of pivotal movement generally about the longitudinal axis of the coil portion. The distal end of the lever arm portion 52 is slidably received in an aperture 54 in an anchor block 56 pivotally supported through a bushing 58 on a bolt 60 threadedly received in an aperture 62 in the frame rail 10.

As seen best in FIGS. 1 and 2, the bolt 60 defines a transverse axis of the sprung mass portion situated parallel and in close proximity to the transverse axis 22 about which the axle carrier orbits. Similarly, the longitudinal axis of the coil portion 48 is disposed parallel to the transverse axis 22 and orbits as a unit with the axle carrier assembly generally about the transverse axis 22. Accordingly, since the lever arm portion 52 intersects or passes relatively close to the transverse axis 22, jounce and rebound deflections of the axle carrier assembly effect little or no pivotal movement of the lever arm portion 52 about the longitudinal axis of the coil portion 48.

Describing now the operation of the auxiliary spring arrangement 24 and assuming that the curb height is below the desired level, with the lever arm portion 52 projecting through the aperture 54 and held stationary relative to the coil portion 48, the latter is twisted about its longitudinal axis until a turning moment of predetermined magnitude is developed on the lever arm portion, the turning moment urging or biasing the lever arm portion in a clockwise direction, FIG. 1, about the longitudinal axis of the coil portion. Thereafter, the tab 50 of the auxiliary spring is set in the slot 42 of the locking bar 40 which is restrained against counterclockwise rotation, FIG. 1, by engagement of the tab 44 on the underside of the depending leg 28 of the bracket 26. With the distal end of the lever arm portion 52 received in the aperture 54, the turning moment developed by the coil portion 48 is transferred to the frame rail 10 as a generally vertically directed force reaction operative to lift the sprung mass portion of the vehicle relative to the unsprung mass portion. The turning moment developed by the coil portion is predetermined to lift the unsprung mass portion by an amount necessary to bring the curb height of the sprung mass portion to a particular desired level.

Referring now to FIG. 1, under static conditions the axle carrier assembly assumes the position thereof shown in solid lines relative to the frame rail 10. Under dynamic conditions, as when the vehicle is in motion, a jounce deflection of the axle carrier assembly relative to the frame rail 10 effects upward movement of the axle carrier assembly from the solid line to the broken line position shown in FIG. 1. During such jounce deflection the proximity of the bolt 60 to the transverse axis 22 dictates that there be little or no pivotal movement of the lever arm portion 52 about the longitudinal axis of the coil portion 48. Therefore, the turning moment developed by the coil portion 48 on lever arm portion 52, and hence the lifting force on the sprung mass portion, remains substantially constant so that during jounce deflection the ride rate experienced by the sprung mass portion is virtually unchanged.

Since the physical characteristics of most automobiles render it extremely difficult to locate the bolt 60 exactly at the transverse axis 22, a compromise is required. In actual practice it has been determined that when the bolt 60 is located with respect to the transverse axis 22 such that the maximum pivotal movement experienced by the lever arm portion 52 about the longitudinal axis of the coil portion 48 does not exceed an included angle of 10°, the effect on the ride rate experienced by the sprung mass portion is negligible.

Figure 5:
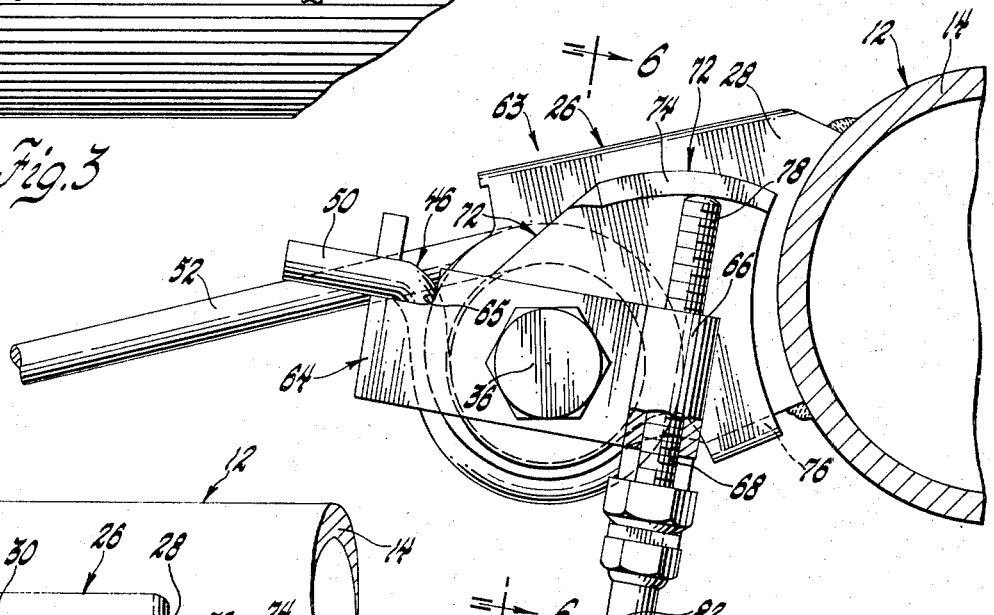
FIG. 5 is an enlarged view of a portion of FIG. 1 showing a modified auxiliary spring arrangement according to this invention.
Figure 6:
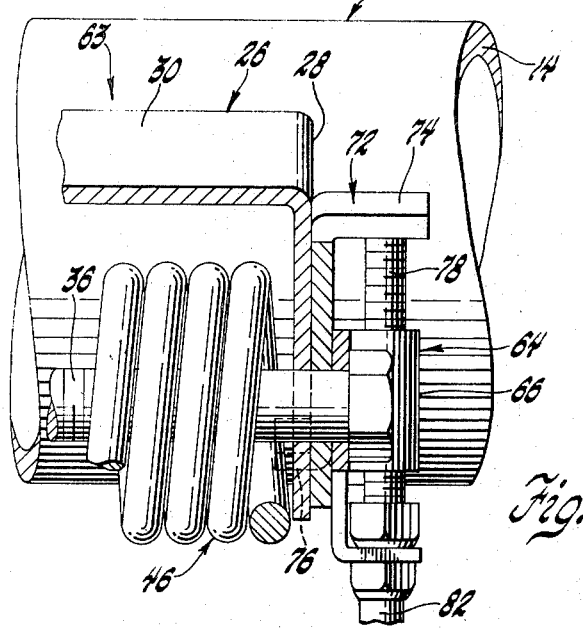
FIG. 6 is a view taken generally along the plane indicated by lines 6—6 in FIG. 5.

Referring now to FIGS. 5 and 6 and describing a modified auxiliary spring arrangement according to this invention designated 63, the latter includes a modified locking bar 64 pivotally supported on the bolt 36. The modified locking bar includes a slot 65 similar to the slot 42 in the locking bar 40 and a rolled end portion 66 defining a threaded bore 68. An intermediate lever 72 is disposed between the locking bar 64 and the depending leg 28 of the bracket 26 and defines a flange 74 and a tab 76. A threaded stud 78 is received in the bore 68 on the locking bar and is connected to a rotatable flex shaft 80 disposed within a sheath 82 rigidly connected at one end by conventional means to the locking bar 64. The flex shaft is connected at its remote end to a rotary input device such as a crank or the like so that rotation of the crank effects concurrent rotation of the flex shaft and the stud 78.

The upper end of the stud 78 engages the underside of the flange 74 on the intermediate lever and the tab 50 on the coil portion 48 of the auxiliary spring is received in the slot 65 so that the locking bar 64 is urged in a counterclockwise direction, FIG. 5, until engagement is effected between the stud 78 and the flange 74. Thereafter, the intermediate lever 72 is urged in a counterclockwise direction, FIG. 5, until the tab 76 engages the underside of the depending leg 28. Under these conditions, a turning moment of predetermined magnitude is developed on the lever arm portion 52 as described hereinbefore. If it is desired to increase the developed turning moment, the stud 78 is rotated by the flex shaft 80 to pivot the locking bar 64 in a clockwise direction about the bolt 36. As the developed turning moment increases, the curb height of the sprung mass portion similarly increases until a desired level is achieved. Rotation of the stud 78 in the opposite direction, of course, effects pivotal movement of the locking bar 64 in a counterclockwise direction, FIG. 5, and decreases the magnitude of the turning moment and, therefore, the curb height of the sprung mass portion. Under dynamic conditions, the modified auxiliary spring arrangement 63 functions in a manner identical to that described hereinbefore with respect to the arrangement 24 so that the ride rate experienced by the sprung mass portion is virtually unchanged.

It will, of course, be apparent to those skilled in the art that the auxiliary spring arrangement according to this invention is reversible. More particularly, the application shown and described herein relates to those situations where the weight of the sprung mass portion exceeds expectations. If the sprung mass portion were lighter than normal, the auxiliary spring could be reversed to exert a lowering or pull-down force on the sprung mass portion for trimming the curb height. Of course, minor modification in the location of the anchor block 56 would also be required but the operation of the auxiliary spring would be as described herein.

Having thus described the invention, what is claimed is:

1. In a vehicle having a sprung mass portion, an unsprung mass portion, control means disposed between said sprung and said unsprung mass portions for constraining jounce and rebound deflections of the latter relative to the former to an orbit about a transverse axis of said sprung mass portion, and primary suspension spring means disposed between said sprung and said unsprung mass portions operative to maintain the former at a predetermined curb height relative to the latter under static conditions, the combination comprising, auxiliary spring means including a lever arm rotatable about a spring axis defined by said auxiliary spring means, means on said auxiliary spring means for developing a turning moment on said lever arm of predetermined magnitude biasing said lever arm in one direction of rotation about said spring axis, means supporting said auxiliary spring means on said unsprung mass portion for movement as a unit therewith and with said spring axis parallel to said transverse axis, and means connecting said lever arm and said sprung mass portion generally at said transverse axis so that pivotal movement of said lever arm about said spring axis during relative jounce deflection of said unsprung mass portion does not exceed an included angle of 10°, and predetermined turning moment on said lever arm being operative to alter the curb height of said sprung mass portion relative to said unsprung mass portion under static conditions.

2. In a vehicle having a body portion, an axle carrier disposed transversely with respect to said body portion, a plurality of control arms disposed between said body portion and said axle carrier for constraining jounce and rebound deflections of the latter relative to the former to an orbit about a transverse axis of said body portion, and primary suspension spring means disposed between said body portion and said axle carrier operative to maintain the former at a predetermined curb height relative to the latter under static conditions, the combination comprising, an auxiliary spring having a cylindrical coil portion and an integral lever arm portion, said lever arm portion being pivotable generally about a longitudinal axis of said coil portion, means supporting said coil portion on said axle carrier for movement as a unit therewith and with said longitudinal axis disposed parallel to said body portion transverse axis, means between said axle carrier and said coil portion operative to rigidly secure one end of said coil portion to said axle carrier so that said coil portion develops a turning moment on said lever arm portion biasing the latter for rotation in one direction generally about said longitudinal axis, and means connecting said lever arm portion and said body portion generally at said transverse axis so that pivotal movement of said lever portion generally about said longitudinal axis during relative jounce deflection of said axle carrier does not exceed an included angle of 10°, said turning moment on said lever arm portion being operative to alter the curb height of said body portion relative to said axle carrier under static conditions.

3. The combination recited in claim 2 further including means between said axle carrier and said auxiliary spring operative to vary the magnitude of the turning moment developed on said lever arm portion.

4. In a vehicle having a body portion, an axle carrier disposed transversely with respect to said body portion, a plurality of control arms disposed between said body portion and said axle carrier for constraining jounce and rebound deflections of the latter relative to the former to an orbit about a transverse axis of said body portion, and primary suspension spring means disposed between said body portion and said axle carrier operative to maintain the former at a predetermined curb height relative to the latter under static conditions, the combination comprising, an auxiliary spring having a cylindrical coil portion and an integral lever arm portion, said lever arm portion being pivotable generally about a longitudinal axis of said coil portion, means supporting said coil portion on said axle carrier for movement as a unit therewith and with said longitudinal axis disposed parallel to said body portion transverse axis, means on one end of said coil portion defining a tab, a locking bar disposed on said axle carrier assembly for pivotable movement about said longitudinal axis, said locking bar being engageable on said tab for effecting rotation of said one end of said coil portion thereby to develop a turning moment on said lever arm portion, an intermediate lever disposed on said axle carrier for pivotal movement about said longitudinal axis, means on said intermediate lever and on said axle carrier for establishing a rigid connection therebetween, a rotary screw member, thread means on said locking bar supporting said screw member for rotation and for longitudinal bodily movement relative to said locking bar, said screw member being engageable on said intermediate lever and operative upon rotation to effect angular movement of said locking bar relative to said intermediate lever and said axle carrier thereby to vary the magnitude of the turning moment developed on said lever arm portion, and means connecting said lever arm portion and said body portion generally at said transverse axis so that pivotal movement of said lever arm portion generally about said longitudinal axis during relative jounce deflection of said axle carrier does not exceed an included angle of 10°, the turning moment developed on said lever arm portion being operative to alter the curb height of said sprung mass portion under static conditions.

* * * * *